United States Patent Office 3,541,150
Patented Nov. 17, 1970

3,541,150
CERTAIN ALDOXIME SUBSTITUTED CARBAMATES AND THEIR USE AS INSECTICIDES AND ACARICIDES
Arnold D. Gutman, Pinole, Calif., assignor to Stauffer Chemical Company, New York, N.Y., a corporation of Delaware
No Drawing. Filed May 15, 1968, Ser. No. 729,417
Int. Cl. C07c *131/00*
U.S. Cl. 260—566       4 Claims

ABSTRACT OF THE DISCLOSURE

Compounds of the formula

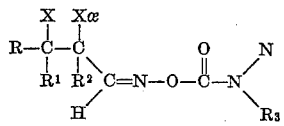

in which X and X' are halogen, R and $R^1$ are hydrogen, halogen, lower alkyl or halo lower alkyl; $R^2$ is hydrogen, halogen, lower alkyl; $R^3$ is alkyl and the use of the compounds as insecticides and acaricides.

This invention relates to certain novel chemical compounds and to their use as insecticides and acaricides. More particularly, the chemical compounds are certain aldoxime substituted carbamates.

The compounds of this invention are those having the formula

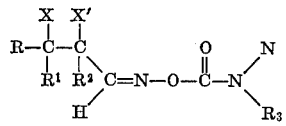

in which—

X and X' are halogen, preferably chloro,
R and $R^1$ are independently selected from the group consisting of:
 (a) hydrogen,
 (b) halogen, preferably chloro,
 (c) lower alkyl, preferably having 1 to 4 carbon atoms, more preferably chloromethyl
$R^2$ is selected from the group consisting of:
 (a) hydrogen,
 (b) halogen, preferably chloro,
 (c) lower alkyl, preferably having 1 to 4 carbon atoms, more preferably methyl, and
$R^3$ is alkyl, preferably having 1 to 4 carbon atoms, more preferably methyl.

The term "halogen" used in the description of the compounds means chlorine, bromine, iodine and fluorine.

The compounds of the present invention can be prepared by reacting a compound of the formula

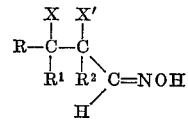

with a compound of the formula $R^3—N=C=O$ where X, X', R, $R^1$, $R^2$ and $R^3$ are as previously defined.
The above reaction yields compounds of the formula

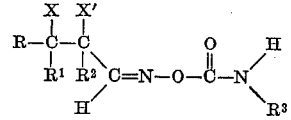

in which X, X', R, $R^1$, $R^2$ and $R^3$ are as defined above.
Preferably, a 1:1 mole ratio of the two reactants is used. However, the reaction runs well using excess isocyanate. Preferably, the reaction is carried out in a nonreactive solvent such as acetone, benzene or chloroform. In some cases, the reaction is exothermic so no heating is required. Cooling can be used if the reaction becomes too vigorous. If the reaction is not exothermic, then heating from room temperature to reflux causes the reaction to readily proceed. The compounds of this invention can be recovered from the reaction mixture and purified by standard procedures.
Preparation of the compounds of this invention is illustrated by the following example.

EXAMPLE I

Butyrchloraloxime-N'-methylcarbamate 17.5 grams (0.1 mole) of butyrchloral and 14.0 grams (0.21 mole) of hydroxylamine hydrochloride are combined with 200 ml. of ethanol and 10 ml. of water. The mixture is heated under reflux for 4 hours. The mixture is cooled to room temperature and extracted with three 100 ml. portions of chloroform. The chloroform phases are combined, washed with 100 ml. of ice-water, dried with anhydrous $MgSO_4$, and evaporated to yield 15.4 grams (80.8% of theory) of butyrchloraloxime $n_D^{30}=1.5100$.

15.0 grams (0.079 mole) of butyrchloral is dissolved in 10 ml. of acetone. 10 ml. of methyl isocyanate is added to the solution and the temperature rises to 35° C. The mixture is allowed to stand at room temperature for 1 hour. 250 ml. of benzene is added, and the mixture is washed with two 100 ml. portions of water. The benzene phase is dried with anhydrous $MgSO_4$ and evaporated to yield 13.4 grams (68.8% of theory) of butyrchloraloxime-N'-methylcarbamate. $n_D^{30}=1.5110$.

The following is a table of certain selected compounds preparable according to the procedure described heretofor. Compound numbers are assigned to each compound for use throughout the remainder of the specification.

TABLE I

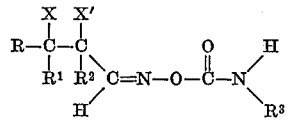

| Compound number | R | $R^1$ | $R^2$ | X | X' | $R^3$ |
|---|---|---|---|---|---|---|
| 1 | H | H | Methyl | Cl | Cl | Methyl. |
| 2 | Methyl | H | H | Br | Br | Ethyl. |
| 3 | H | Methyl | Cl | F | F | Butyl. |
| 4 | Butyl | Br | Br | I | I | Methyl. |
| 5 | Methyl | H | H | Cl | Cl | Do. |
| 6 | Cl | Cl | Butyl | Cl | Cl | Ethyl. |
| 7 | Methyl | Butyl | H | Cl | Cl | Methyl. |
| 8 | Chloromethyl | Chloromethyl | Cl | Cl | Cl | Do. |
| 9 | Bromoethyl | H | Br | Br | Cl | Ethyl. |
| 10 | H | Methyl | Cl | Cl | Cl | Methyl. |

As previously stated, the compounds of this invention are useful as insecticides and acaricides.

Insecticidal evaluation test.—The housefly (HF), *Musca domestica* (Linn.), was subjected to evaluation tests for insecticides incorporating the compounds of the present invention.

Twenty-five female flies, three to five days old, were caged in cardboard mailing tubes 3⅛" in diameter, 2⅝" tall. The cages were supplied with cellophane bottoms and coarse mesh nylon tops. Each cage was provided with food and water. The candidate toxicant was dissolved in a volatile solvent, preferably acetone. The solution was pipetted into a Petri dish bottom, allowed to air dry and placed in a cardboard mailing tube cage. The flies were continuously exposed to the known residue of the active compound in the cage. After twenty-four and forty-eight hours, counts were made to determine living and dead insects. The LD–50 values were calculated using well-known procedures. The results of this insecticidal evaluation test is given in Table II under "HF." The Lygus bug (LB), *Lygus hesperus*, was treated similarly as the houseflies, except ten to twenty-five insects were used per cage. The caged insects were sprayed with the candidate compounds at various concentrations. After twenty-four and seventy-two hours, counts were made to determine living and dead insects. The LD–50 (percent) values were calculated. These values are reported under the column "LB" in Table II.

The insect species bean aphid (BA), *Aphis fabae*, was also employed in the test for insecticidal activity. Young nasturtium plants were used as the host plants for the bean aphid. The host plant was infested with approximately 50 of the aphids. The test chemical was dissolved in acetone, added to water, which contained a small amount of Sponto 221 ®, an emulsifying agent. The solution was applied as a spray to the infested plants. Concentrations ranged from 0.05 percent downward until an LD$_{50}$ value was achieved. These results are given in Table II under the column "BA."

Acaricidal evaluation test.—The two-spotted mite (2SM), *Tetranychus telarious* (Linn.), was employed in tests for miticides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221 ®, polyoxy-ethylene ether sorbitan monolaurate, an emulsifying agent, the amount of water being sufficient to give concentrations of active ingredient ranging from 0.25% to 0.0008%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD–50 value was calculated using well-known procedures. These values are reported under the columns "2SM–PE" and "2SM–Eggs" in Table II.

Systemic evaluation test.—This test evaluates the root absorption and upward translocation of the candidate systemic compound. The bean aphid (BA), *Aphis fabae*, was employed in the test for systemic activity.

Young nasturtium plants were used as the host plants for the bean aphid. The host plants were transplanted into one pound of soil that had been treated with the candidate compound. Immediately after planting in the treated soil, the plants were infested with the aphids. Concentrations of toxicant in the soil ranged from 10 p.p.m. per pound of soil downward until an LD–50 value was obtained. Mortality was recorded after 72 hours.

The percentage of kill of the test specie was determined by comparison with control plants placed in distilled water or untreated soil. The LD–50 values were calculated.

These systemic test results are reported in Table II under the column "BA-sym."

TABLE II

| Compound number | HF, mg. | LB, percent | BA, percent | BA-sym, p.p.m. | 2 SM PE, percent | 2 SM Eggs, percent |
|---|---|---|---|---|---|---|
| 1 | 30 | .005 | .003 | 1 | .03 | |
| 2 | | | .005 | | .05 | .03 |
| 3 | | .008 | .003 | 8 | .03 | |

As those in the art are well aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clay, diatomaceous earth, various flours such as walnut shell, wheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

I claim:

1. A compound of the formula

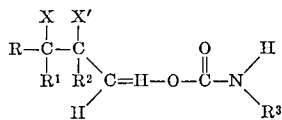

in which X and X' are halogen; R and R$^1$ are independently selected from the group consisting of hydrogen, halogen, lower alkyl and halo-lower alkyl, R$^2$ is selected from the group consisting of hydrogen, halogen and lower alkyl; and R$^3$ is alkyl of 1 to 4 carbon atoms.

2. The compound of claim 1 in which X and X' are chloro, R and R$^1$ are hydrogen, R$^2$ is methyl and R$^3$ is methyl.

3. The compound of claim 1 in which X and X' are chloro, R is methyl, R$^1$ and R$^2$ are hydrogen and R$^3$ is methyl.

4. The compound of claim 1 in which X and X' are chloro, R is hydrogen, R$^1$ is methyl, R$^2$ is chloro and R$^3$ is methyl.

References Cited

UNITED STATES PATENTS 3,063,823  11/1962  Kühle et al. _____ 71—2.6
3,299,137  1/1967  Payne et al. _____ 260—566

LEON ZITVER, Primary Examiner

G. A. SCHWARTZ, Assistant Examiner

U.S. Cl. X.R.

424—327

UNITED STATES PATENT OFFICE
CERTIFICATE OF CORRECTION

Patent No. 3,541,150                    Dated November 17, 1970

Inventor(s) Arnold D. Gutman

It is certified that error appears in the above-identified patent and that said Letters Patent are hereby corrected as shown below:

In the Abstract of the Disclosure, the formula should read:

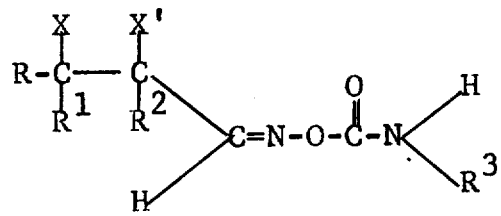

Column 1, line 33, the formula should read:

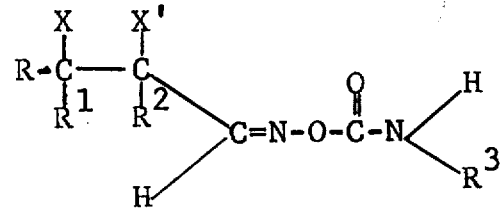

Column 3, line 62, the word "unward" should ---upward---.

Column 4, line 45, the formula should read:

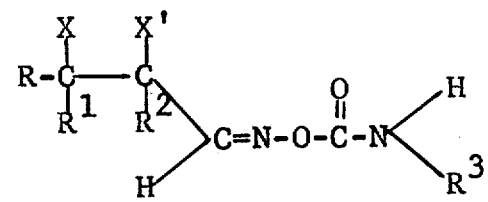

Signed and sealed this 29th day of June 1971.

(SEAL)
Attest:

EDWARD M. FLETCHER, JR.                    WILLIAM E. SCHUYLER